March 3, 1936.                R. L. ROGERS                2,032,667
                             SANDING APPARATUS
                           Filed March 6, 1935

INVENTOR.
Roy L. Rogers.
BY Walter C. Ross.
ATTORNEY.

Patented Mar. 3, 1936

2,032,667

UNITED STATES PATENT OFFICE 2,032,667

SANDING APPARATUS

Roy L. Rogers, Mittineague, Mass.

Application March 6, 1935, Serial No. 9,551

2 Claims. (Cl. 275—2)

This invention relates to improvements in sanding apparatus and is directed more particularly to an apparatus for distributing sand on the roadway or the like.

The principal objects of the invention are directed to the provision of a novel sanding apparatus which is adapted to readily distribute sand and/or similar material on roadways and the like and according to the preferred embodiment of the invention the apparatus consists of a novel trailer device which may be attached to a dump truck or the like.

According to special features of the invention, the apparatus consists of a trailer which supports suitable mechanism and which may be connected to the rear end of a dump truck or the like and then a dump body may be elevated to deliver sand to the trailer to be distributed by the novel apparatus of the invention.

Various other novel features and advantages of the invention will be hereinafter more fully referred to in connection with the accompanying description of the preferred form of the invention and reference will be had for illustrative purposes to the accompanying drawing, wherein.

Figure 1:
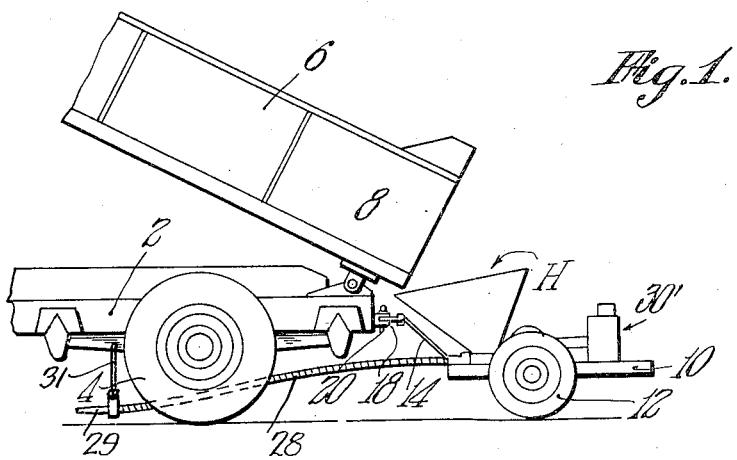
Fig. 1 is an elevational view of the rear portion of a dump truck having the apparatus of the invention associated therewith.
Figure 2:
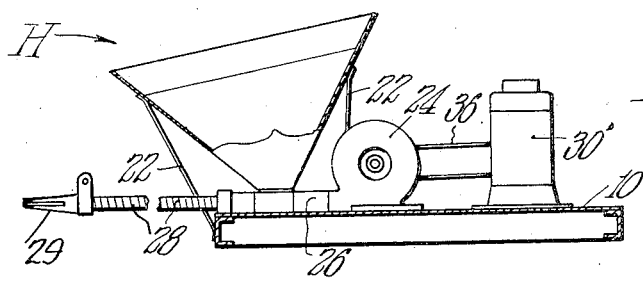
Fig. 2 is a partial side elevational and sectional view to explain certain features of the invention.
Figure 3:
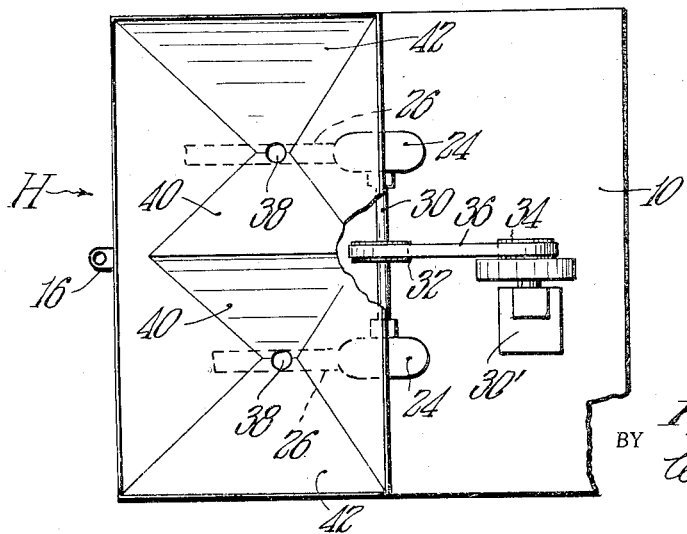
Fig. 3 is a plan view of the apparatus shown in Fig. 2 with parts broken away for clearness.

Referring now to the drawing more in detail, the invention will be fully described.

The rear end portion of a dump truck is shown in Fig. 1. The frame thereof is represented by 2 and this is supported by the usual wheels 4. A body 6 is pivoted at 8 to the frame so that it may be elevated to the dumping position shown. This body 6 is adapted to carry a supply of sand or other material which it is desired to distribute on the roadway.

A platform 10 is provided for supporting the apparatus and this is suitably mounted on wheels such as 12 at either side thereof. The platform is attached to the truck in any one of various ways, but preferably a draw bar 14 extends forwardly from the supporting platform 10. This is arranged on its forward end to have an eye 16 which is receivable in a bracket 18 provided on the rear side of the body 6. The eye and bracket may be attachably connected by means of a pin or the like 20. In this way, the apparatus constituting the invention may be carried along by and behind the truck.

A hopper H is supported in some suitable manner to the platform 10 as by supports 22 and this is adapted to receive sand from the dump body when in the position shown in Fig. 1. One or more blowers such as 24 are supported by the platform 10 and these have outlets or discharge conduits such as 26 extending outwardly therefrom.

In the form of the invention shown, the conduits 26 extend below the hopper H and carry on their ends discharge conduits 28 which may be in the form of flexible hose, tubes, or the like. Any type of pressure discharge apparatus may be used in lieu of the blowers shown but the blowers will suffice to explain the invention.

A shaft 30 may extend between the blowers 24 and a source of power for the blowers is represented by 30'. This source of power may take the form of an internal combustion engine and it may be connected to the shaft 30 by some suitable means such as pulleys 32 and 34 and a belt 36.

The feed ratio of the shaft 30 and the driving shaft of the engine 30' may be regulated as desired and where pulleys and a belt are used for the driving function, this may be accomplished by varying the size of the pulleys, for example. Otherwise, the shaft 30 may be gear driven from the engine 30' by means of a chain gear mechanism well known to those skilled in the art.

Sand to be delivered by the blowers 24 is delivered to the conduit exhaust side of the blowers and this may be accomplished by means of openings 38 which extend from the hopper into the conduit 26.

To properly cause the sand to flow into the openings 38 the hopper H may be provided with central baffle plates such as 40 and end walls 42. The plates 40 preferably extend in opposite directions from the center of the hopper downwardly and towards the said openings while the end walls 42 may likewise extend toward the openings.

The walls are preferably inclining and thus they serve to direct sand into the openings.

In the form of the invention shown the sanding device is placed at the rear end of the truck. The body 6 carries a supply of sand and as the truck moves along the roadway with the body in an inclined position, the sand therein flows into the hopper H. The inclining walls of the hopper cause the sand to flow into and through the openings 38 of the conduit 26. With the blowers in operation the sand is then blown through and out the discharge conduits 28.

The conduits 28 may be of such a nature that the operator may direct the sand from either one or both of the blowers in any direction desired. The ends of the conduits may carry nozzles 29. In some cases, it may be desirable to locate the delivery end of the conduit or conduits 28 at the forward side of the wheel of the truck to facilitate the obtaining of sufficient traction so that the truck may make its way along an icy roadway. As shown in Fig. 1 in this case the nozzles 29 may be supported by a rod 31 or the like suspended from frame 2.

Or, if desired, in operation, an operator may stand on the platform and by means of the flexible conduits direct the same so that sand is distributed throughout the surface of a roadway or the like.

The device is particularly adapted for use with trucks and since it may be readily disconnected therefrom it will be apparent that when one truck has exhausted its supply of sand, another truck may be connected to the sanding device and in that way there may be a practically continuous sand-spreading or delivering operation.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. The combination with a truck having a movable dump body of an apparatus for distributing sand adjacent the rear wheels of said body comprising, a trailer device for detachably connecting to the rear end of said truck and having rotatable wheels so as to be movable with the truck when connected thereto, a hopper supported on said trailer device provided with an opening in its upper side for receiving sand from said dump body and a discharge outlet in its lower side through which the sand may flow, a blower supported on said trailer device adjacent the rear side of the hopper, a motor for operating said blower supported on the trailer device, a horizontally extending tubular member extending beneath said hopper and having its rear end portion operatively connected to said blower, and a flexible discharge conduit extending forwardly from said tubular member and having its forward end directed to adjacent the rear wheels of said truck, said tubular member being provided with an opening in its upper side which is in alignment with said discharge outlet of the hopper for receiving sand therethrough, all adapted and arranged whereby said blower may be operated to discharge sand which is received in the tubular member outwardly through said discharge conduit onto a roadway at a point adjacent the rear wheels of said truck.

2. The combination with a truck having a movable dump body of an apparatus for distributing sand adjacent the rear wheels of said body comprising, a trailer device for detachably connecting to the rear end of said truck and having rotatable wheels so as to be movable with the truck when connected thereto, a hopper supported on said trailer device provided with an opening in its upper side for receiving sand from said dump body and a pair of spaced discharge outlets in its lower side through which the sand may flow, baffle plates in said hopper for directing the sand downwardly towards said outlets, a pair of spaced blowers supported on said trailer device adjacent the rear side of the hopper, a motor for operating said blowers supported on the trailer device between said blowers, a pair of spaced horizontally-extending tubular members extending beneath said hopper each having its rear end portion operatively connected to one of said blowers, and a pair of flexible discharge conduits extending forwardly from said tubular members and having their forward ends directed to adjacent the rear wheels of said truck, said tubular members being provided with openings in their upper sides which are in alignment with the discharge outlets of the hopper for receiving sand therethrough, all adapted and arranged whereby said blowers may be operated to discharge sand which is received in the tubular members outwardly through said discharge conduits onto a roadway at a point adjacent the rear wheels of said truck.

ROY L. ROGERS.